Figure 10B:
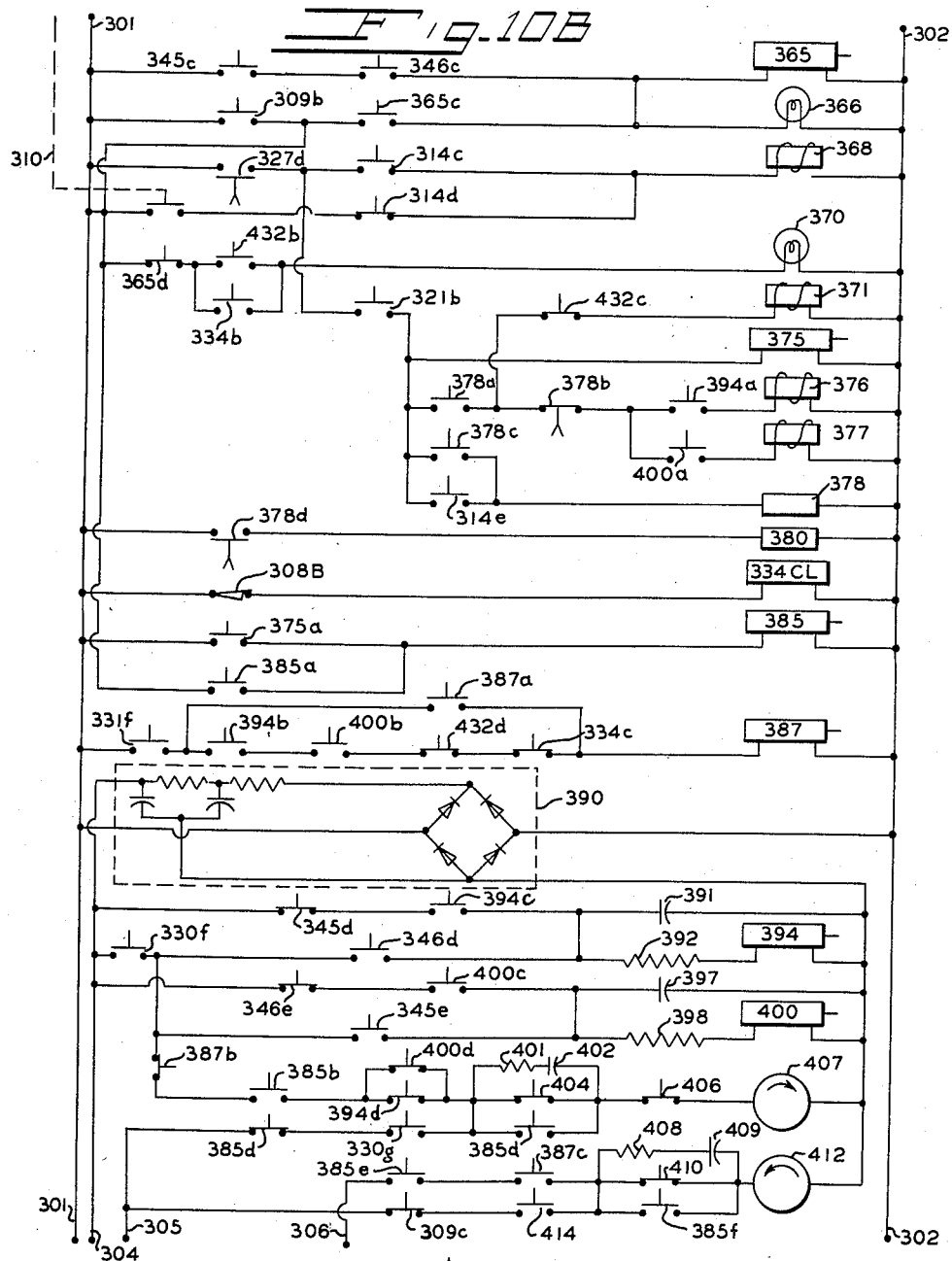

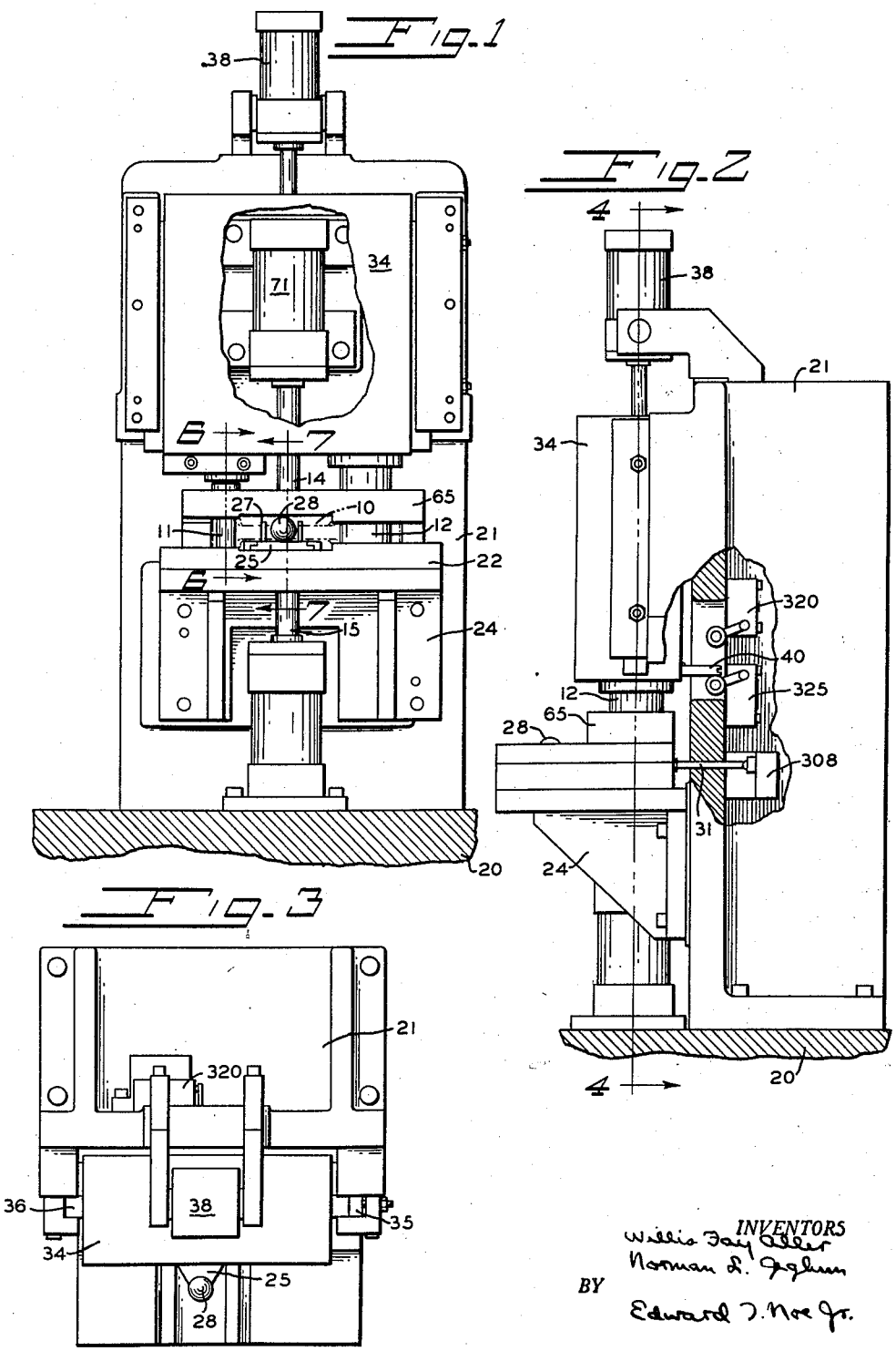

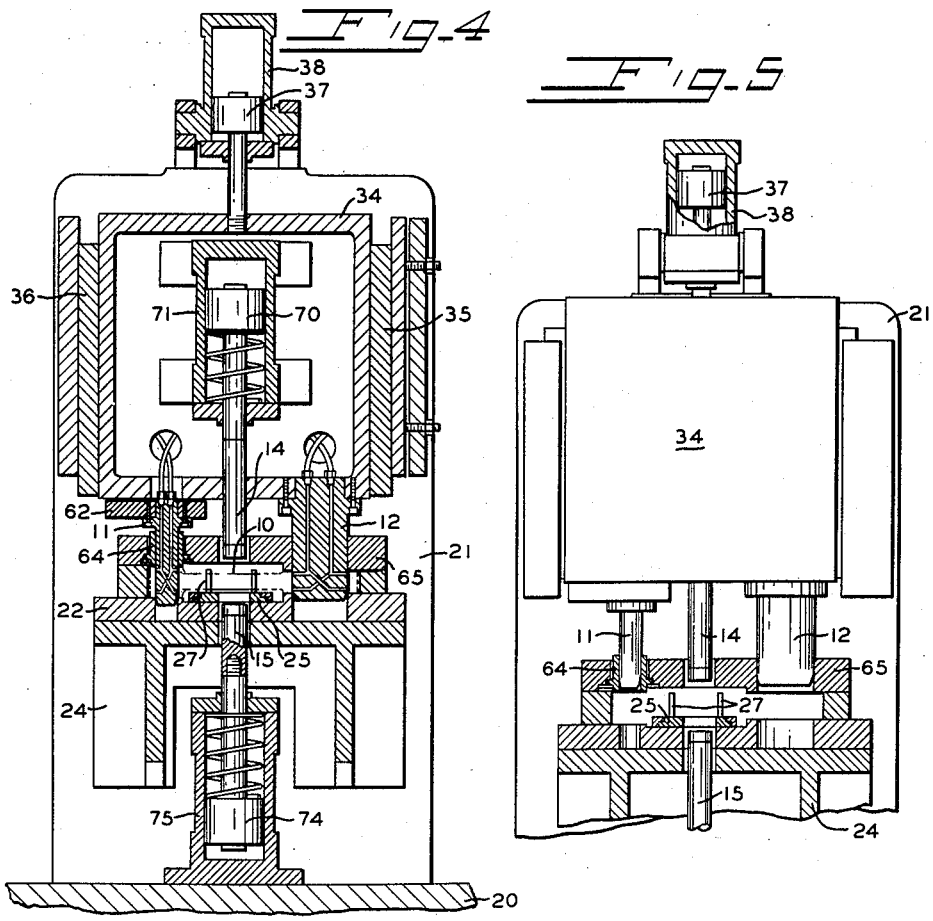
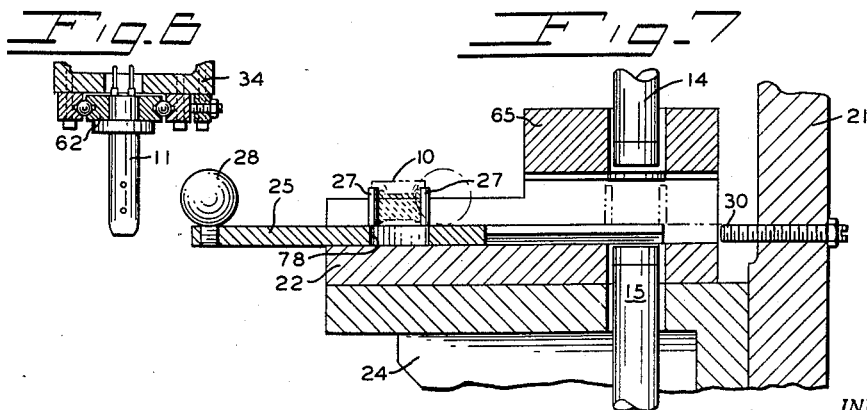

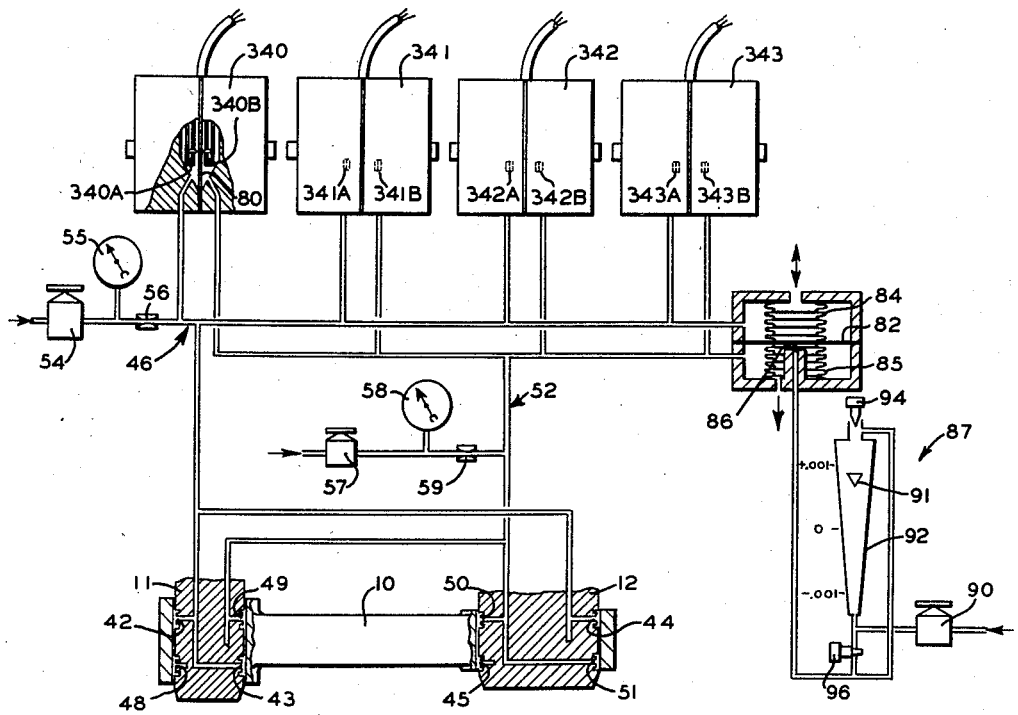
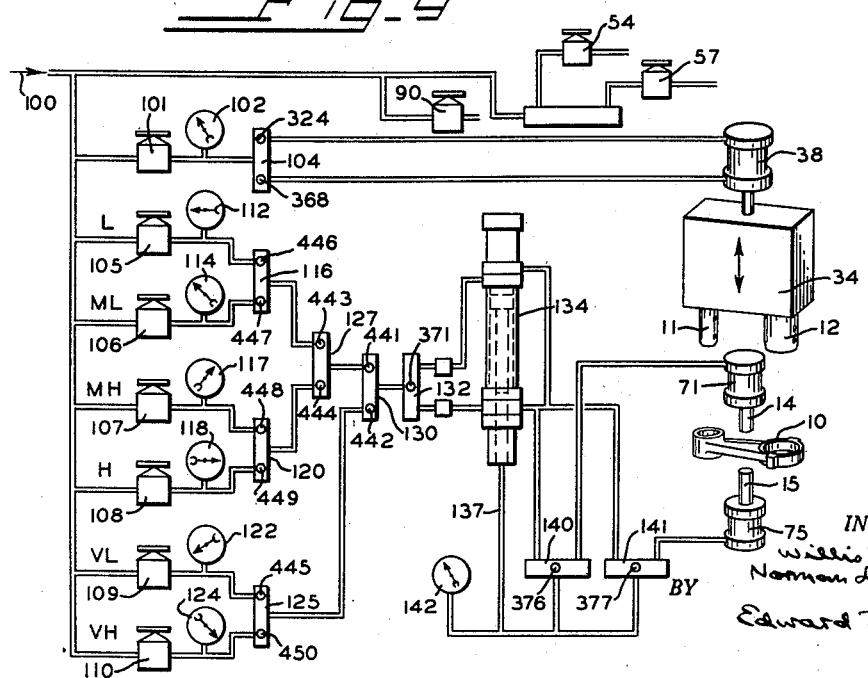

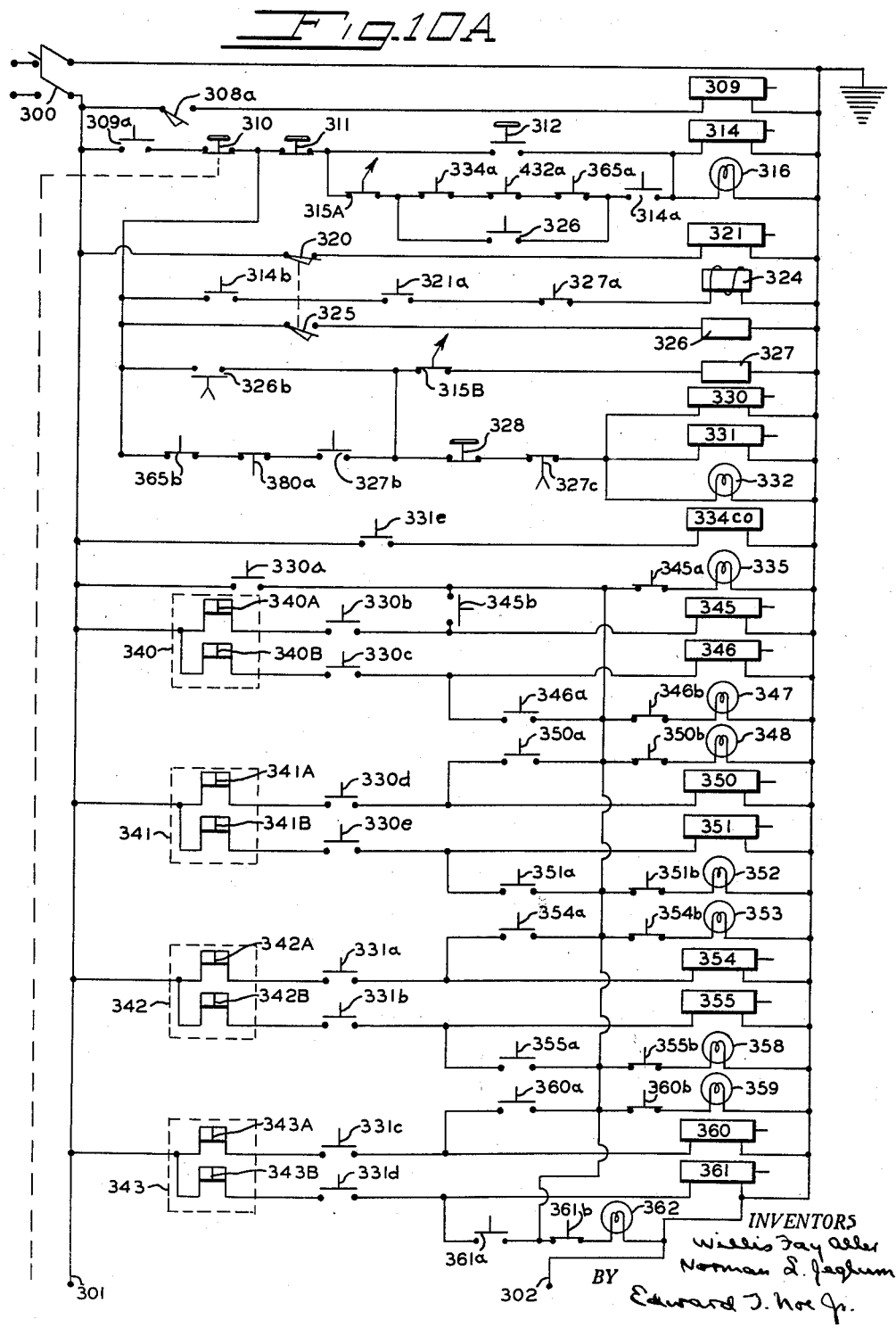

INVENTORS
Willis Fay Aller
Norman R. Gogburn
BY
Edward T. Noe Jr.

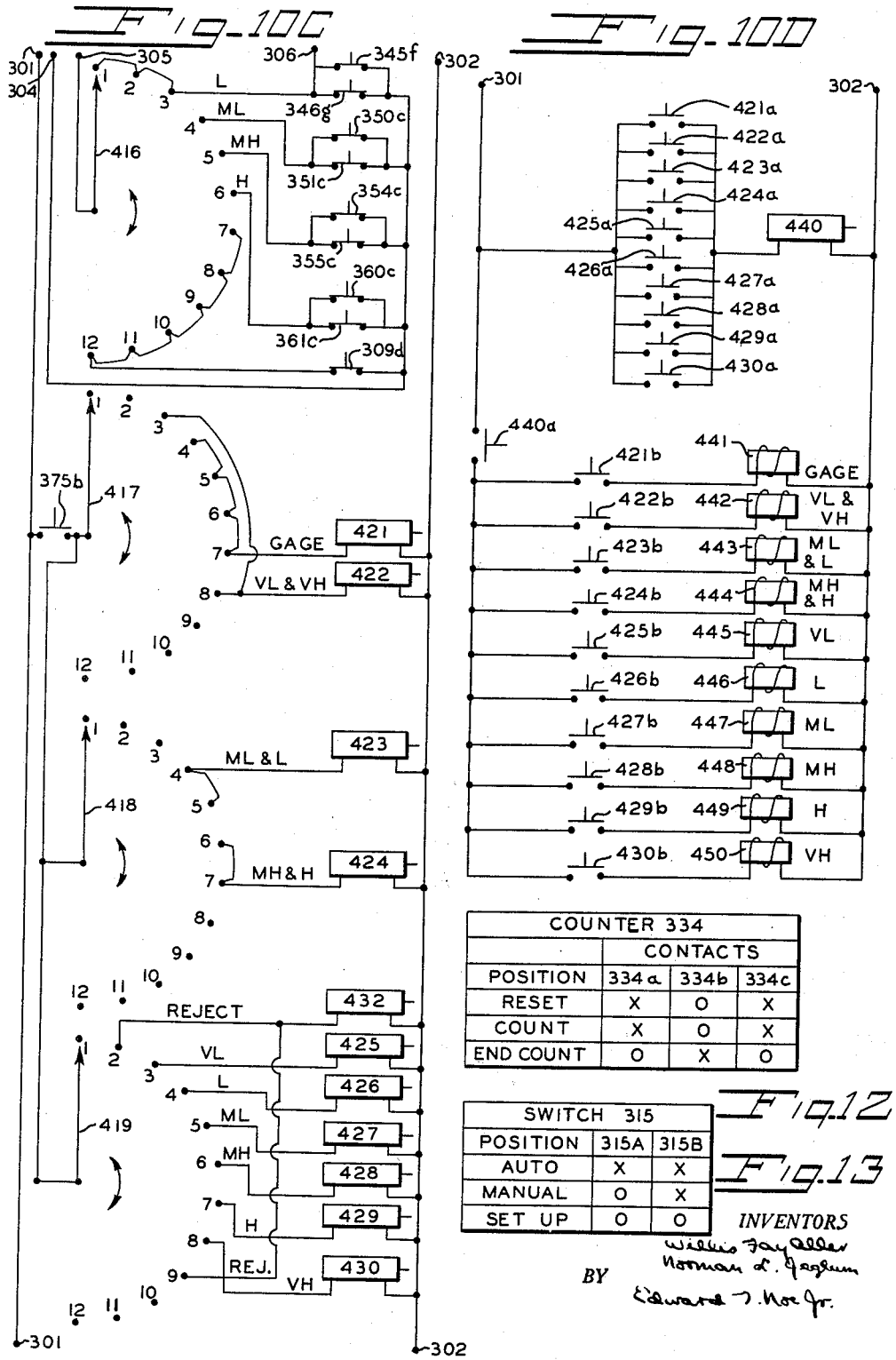

United States Patent Office 2,912,040
Patented Nov. 10, 1959

2,912,040

APPARATUS FOR BENDING A PART TO A PREDETERMINED CONFIGURATION

Willis Fay Aller and Norman L. Jeglum, Dayton, Ohio, assignors, by mesne assignments, to The Sheffield Corporation, a corporation of Delaware Application February 29, 1956, Serial No. 568,474

19 Claims. (Cl. 153—50)

This invention relates to machines for automatically gaging and forming a part to a predetermined desired configuration.

It is an object of this invention to provide an apparatus for automatically gaging a part and applying a bending operation determined by the gaging results, regaging the part and, if necessary, applying another bending operation automatically predetermined as to direction and amount to place the part into the desired configuration.

It is a further object to provide an apparatus for automatically gaging a part and applying a bending operation determnied by the gaging results and based on the flexibility or elastic limit of a nominal part, regaging the part to determined the results of the prior bending and, if necessary, applying another bending operation determined by the character of the particular part.

It is a further object to provide an apparatus for automatically gaging a part to determine the deviation of the part from a desired configuration and utilizing a force application of a direction and magnitude determined by the gaging operation to bend the part to the desired configuration, regaging the part to determine the results of the prior bending, and, if necessary, applying another force application of a direction and magnitude determined by both the regaging and previous force application.

It is a further object to provide such an apparatus where, following the initial force application, subsequent applications are automatically repeated as necessary and are in opposition to the part deviation, being of increased magnitude if the deviation is in the same sense as previously gaged and reduced in magnitude if the deviation is reversed.

It is a further object to provide an apparatus for automatically gaging the relation between the axes of a pair of holes in a part such as the pin and crank holes in a connecting rod and bending the part to place the axes in a predetermined relation, the force applications to the part being automatically determined as to direction and magnitude in a unique and advantageous manner.

It is a further object to provide an apparatus having a station for receiving a part such as a connecting rod, the station providing gaging probe or spindle means for insertion into holes in the part to determine the relation of the axes thereof, following which the probe means are automatically retracted and opposed fluid pressure force applying means are selectively operated for a force application of a magnitude automatically calculated to bend the part and place the holes in a predetermined relationship.

Figure 11:
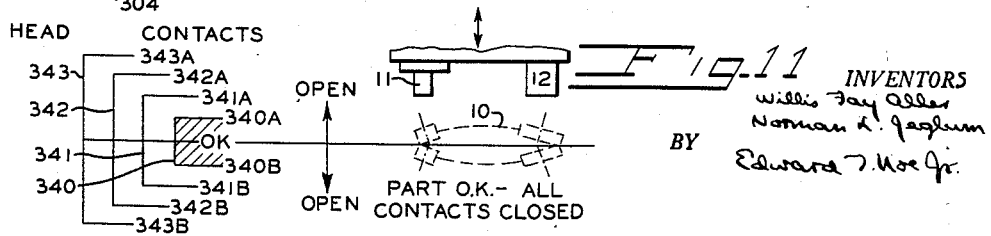

Other objects and advantages of the invention will be apparent from the following description, the appended claims, and the accompanying drawings, in which, Figure 1 is a front view, in elevation and partially broken away, of an apparatus embodying the present invention, Figure 2 is a side view of the apparatus, also partially broken away, Figure 3 is a plan view of the apparatus, Figure 4 is a sectional view on the line 4—4 of Figure 2, Figure 5 is a front view of the upper portion of the apparatus in partial central section, Figure 6 is a sectional view on line 6—6 of Figure 1, Figure 7 is a sectional view on line 7—7 of Figure 1, Figure 8 is a diagram of an air-electric gaging system for gaging the part, Figure 9 is a diagram of an air-hydraulic system for bending the part and actuating the gaging means, Figures 10A to 10D form a continuous diagram of an exemplary electrical circuit for controlling the apparatus, Figure 11 diagrammatically illustrates the response of the electrical gaging contacts to the part configuration, and Figures 12 and 13 are charts of switch conditions in the electrical diagram.

The present invention provides an apparatus for automatically gaging a part to determine its deviation from a desired configuration and applying the proper force to bend the part to the configuration desired. The apparatus can be used for straightening any elongated part by bending it at a point generally midway between its ends to obtain a desired final relation between the end portions of the part. In the exemplary application illustrated, the relationship between the axes of pin and crank holes of a connecting rod of an engine is gaged and the necessary force applications are made to bend the rod and place these holes in parallelism. The invention has application to other and materially different parts and in other forms than that particularly illustrated and later described.

Although apparently the same in appearance and dimension, similar parts may vary considerably in their flexibility or elastic limit because of differences in composition, heat treatment, volume, cross-sectional configuration and like conditions. In the present invention, this possible variation is automatically taken into consideration and is a factor in determining the force applications to the part. In the illustrated application one of several different pressures can be applied to the part in selected reverse directions. Where desired, the magnitude of force application can be varied as to length or stroke to obtain substantially the same results.

In the operation of the illustrated apparatus the part is initially gaged to determine its deviation from the configuration desired and a force application is made which is determined in direction and magnitude by the gaging result and based on the flexibility or elastic limit of a nominal part. Following each force application the part is again gaged, the gaging result automatically compared with previous data, and the next force application, if necessary, is determined in accordance therewith and based on the flexibility of the particular part.

If the bend of a connecting rod, for example, is in the same direction following a force application, the next force application is increased in magnitude on the basis that the stiffness of the rod was underestimated. However, if the force application bends the rod in the opposite direction the direction of force application is reversed and reduced in magnitude on the basis that the rod is not as stiff as expected. The operation is fully automatic and the gaging and bending cycle is repeated until the pin and crank holes are to the desired parallelism or until a predetermined limit in the number of cycles is reached.

In the illustrated apparatus a connecting rod 10 is placed in position in a gaging and bending station by the operator and the operation is automatically carried through. Gaging spindles or probes 11 and 12 move downward into the piston pin and crank holes of the rod respectively to gage the parallelism of the holes and the bend of the rod in a plane including the spindle axes. The gaging results are used to set up an electric circuit and establish a gage classification of the part.

Spindles 11 and 12 then retract and the proper one of hydraulic hammers or plungers 14 and 15 are applied to the center part of the rod with a direction and magnitude of force application determined by the direction and amount of bend of the rod from the desired configuration and the deviation of the holes from desired parallelism.

After each force application the rod is automatically regaged and the gaging results compared with the previous data. The cycle is automatically repeated until either the rod is brought to a satisfactory configuration or a predetermined number of force applications have been made. If at any time after the first force application the maximum pressure available is inadequate, or the minimum pressure excessive, the rod is gaged as a reject and all operations cease.

The apparatus comprises a base 20 having an upwardly extending support 21 carrying the gaging and bending station. A lower hammer pad 22 mounted on a platform 24 extending from support 21 carries a slide 25, manually positioned in this application, to carry a rod 10 to and from position in the station. Slide 25 has four pins 27 projecting from its upper surface for engagement with a central portion of the rod to properly locate it. Knob 28 moves the slide 25 in and out. Adjustable stop 30 (Figure 7) limits the inward movement of slide 25 to properly position the rod and its holes in alignment with the gaging spindles. Rod 31 (Figure 2) at the inner end of slide 25 actuates switch unit 308 to signal the slide position.

Gaging spindles 11 and 12 are mounted at the lower end of a spindle supporting case 34 reciprocated along guides 35 and 36 by a piston 37 operating in an air cylinder 38 mounted at the upper end of support 21. When case 34 is lowered spindles 11 and 12 are inserted into the holes of the connecting rod 10 and, as case 34 is raised, the spindles are extracted. A projecting rod 40 at the rear of case 34 (see Figure 2) is positioned to engage actuating rollers of switches 325 and 320 respectively to signal the advance and retracted positions of the gaging spindles.

Because of the possible variation in spacing of the holes being gaged, spindle 11 is mounted on a ball slide 62 at the lower end of case 34. Spindle 12 will roughly locate the gaging rod as its tapered lower end enters the crank hole and spindle 11 can shift slightly to accommodate variations in spacing. Spindle 11 slides freely in a bushing 64 carried with some looseness in an upper hammer pad 65.

The upper force applying plunger or hammer 14 is actuated by a piston 70 operating within cylinder 71 fixed to support 21. Casing 34 has no rear wall. Lower hammer 15 is actuated by piston 74 operating within cylinder 75 mounted on base 20. The direction of force application and the magnitude thereof is controlled by means of the associated electrical circuit. Upper hammer 14 reciprocates downward through an opening in hammer pad 65 and pad 22 cooperates therewith to support the rod. Lower hammer 15 moves upward through pad 22 and an opening 78 in slide 25 to engage the rod at substantially the midpoint while upper pad 65 supports the rod at its ends. The rod has clearance relatvie to slide 25 to allow downward bending of its center point.

The gaging of the bend of rod 10 along the line of force application and the deviation of the pin and crank holes from parallelism is preferably done by an air leakage type gaging system utilizing open orifices opposing diametrically opposite points in the pin hole and crank hole in a common gaging plane. This orifice arrangement is shown in more detail in Figure 8. Orifice outlets 42, 43 of spindle 11, and 44, 45 of spindle 12, are connected to a common gaging circuit indicated at 46. Similarly orifices 48, 49 of spindle 11, and 50, 51 of spindle 12 are in a common circuit indicated at 52. Circuit 46 includes pressure regulator 54, pressure gage 55, and a restriction 56. Circuit 52 includes regulator 57, gage 58 and restriction 59. Pressures are obtained in circuits 46 and 52 which relatively vary with the escapage through the respective leakage orifices opposing the holes in rod 10 in a known manner. The sense of the pressure difference between the circuits will be indicative of the direction of bend of rod 10 in the gaging plane and the amount of pressure difference will be responsive to the magnitude of the deviation of the bend, or as an equivalent, the direction and magnitude of deviation from the desired parallelism between the holes being gaged in the gaging plane.

The pressures obtained are applied to differential gaging heads 340 to 343, of a known construction, to obtain the opening and closing of switches therein in accordance with the gaging results. A unit which can be employed is disclosed in Patent No. 2,792,569, issued May 14, 1957, to Elwood L. Byrkett. A portion of head 340 has been broken away in partial section to reveal a pair of switch contacts 340A and 340B at opposite sides of a diaphragm 80 dividing the head into two chambers. If the pressure in circuit 52, for example, is higher than the pressure in circuit 46, the center point of rod 10 being bent upward a predetermined amount, diaphragm 80 will be urged to the left as it appears in Figure 8, opening contact 340A. Conversely, if rod 10 is bent downward at its center point diaphragm 80 would be deflected toward contacts 340B. Each of the differential heads 340 to 343 includes a pair of switch contacts labelled A and B in each instance which are adjusted during set-up for response at different rod conditions. Pressure selections of four different magnitudes are available for the initial force application to rod 10 and each pressure can be employed to extend either upper hammer 14 or lower hammer 15. Each set of contacts in heads 340 to 343 serves, on the initial force application, to select a pressure and direction of application through means of the associated electrical circuit.

Figure 11 diagrammatically indicates the switch conditions for the various heads. A connecting rod 10 is represented in that figure below gaging spindles 11 and 12. If the holes in rod 10 are substantially parallel the rod will fall within the range of the OK zone and all contacts will be closed. If the center point of rod 10 is bent upward contacts 340A, 341A and so forth will be progressively opened depending upon the magnitude of deviation from the nominal condition. Similarly, if the rod 10 is bent downward, switches 340B, 341B and so forth will be progressively opened. Thus a signal is fed to the electrical circuit later described in detail which is responsive to the deviation of rod 10 from the desired configuration. In addition to the gaging signals, switches 308, 320 and 325 of Figure 2 signal positions of the various apparatus components.

In order to obtain a visual indication of the relative parallelism of the pin and crank holes of rod 10, the pressures in circuits 46 and 52 are respectively applied to the surfaces of a diaphragm 82 at the exterior of bellows 84 and 85. The difference in pressures applied to diaphragm 82 will cause it to deflect toward or from an open leakage orifice 86 connected to an indicating instrument of the column type indicated at 87. Such an insturment is supplied with air under controlled pressure through a regulator 90 and comprises an indicating float 91 movable along an internally tapered flow tube 92 in accordance with the velocity of flow upward through the tube and the leakage escaping through orifice 86. An adjustment at 94 serves to position float 91 during setup and the amplification of the instrument can be varied by rotation of knob 96 to vary the amount of air bypassed directly from the source to the orifice. The insturment provides a visual indication of the condition of the rod under process.

Signals are fed into the electrical circuit of Figures 10A–D through the system of Figure 8 and the position indicating switches of Figure 2. The circuit in turn automatically controls solenoids in the air-hydraulic system of Figure 9 to advance and retract the gaging spindles 11 and 12, apply the proper hammer while the spindles are retracted and select the magnitude and direction of force application.

Air is supplied to the system of Figure 9 from a source under pressure indicated by arrow 100. Regulators 54, 57 and 90 in the gaging and indicating circuits are at the upper portion of this figure. Regulator 101 and pressure gage 102 are in the line to solenoid actuated valve 104 controlling the application of pressure to piston 37 within cylinder 38 for spindle movements.

Regulators 105 to 110 provide six different pressures which can be selectively applied to hammers 14 and 15 to bend the rod. These pressures are, in order, L (light), ML (medium light), MH (medium high), H (high), VL (very light), and VH (very high). In one commercial application these pressures per square inch are as follows: L–15 pounds, ML–22 pounds, MH–29 pounds, H–36 pounds, VL–8 pounds, and VH–43 pounds. Only pressures L, ML, MH and H are available for the initial force application determined by the gaging operation and they are considered gaging pressures. Pressures VL and VH are for extraordinary conditions and are only used for applications subsequent to the first.

Air supplied from regulators 105 and 106 passes through pressure gages 112 and 114 respectively to an L, ML selection valve 116 controlled by solenoids 446 and 447. Pressures MH and H are indicated by gages 117 and 118 respectively and valve 120 serves to select one or the other of these pressures. Similarly, pressures VL and VH are indicated by gages 122 and 124 and are selected by valve 125. Valve 120 is actuated by solenoids 448 and 449 and valve 125 by solenoids 445 and 450.

Solenoids 443 and 444 are energized selectively to actuate valve 127 in the lines from valves 116 and 120. Valve 130 controlled by solenoids 441 and 442 selects between the gage pressure selections L, ML, MH and H, and the abnormal pressure selections VL and VH. Valve 132, in turn, controls, through energization of solenoid 371, the application of the supplied pressure to a hydraulic booster unit 134 of a known construction. In such units the supplied air pressure is applied to a piston of a given area actuating a smaller piston in the hydraulic system to apply a boosted pressure of a given amplification or boost. Thus the available pressures are selected and applied to the booster where they are amplified in the hydraulic system or circuit leading to the force applying means. Hydraulic pressure is led through line 137 to valve units 140 and 141 selectively applying pressure to upper hammer cylinder 71 and lower hammer cylinder 75 in response to the energizations of solenoids 376 and 377 respectively. The applied pressure is indicated by a gage 42. When solenoids 376 and 377 are deenergized, the flow is exhausted from the cylinders to booster 134 and the cylinders are returned by spring means.

Briefly, the automatic operation is as follows. As a result of the first gaging operation, one of pressures L, ML, MH or H is selected and, through a hydraulic booster, later described, is applied in opposition to the part deviation. The part is automatically regaged through insertion of spindles 11 and 12 which are retracted during force application. If at any time the holes in rod 10 are within the parallel tolerance, the cycle will stop and a signal light will indicate this condition. However, if the holes are not within the allowable tolerance another force application is made. If the part deviation is in the same direction as in the next previous gaging, the pressure is automatically stepped up one classification and reapplied in opposition to the deviation. If the deviation is reversed as the result of the previous force application, the direction of force application is reversed and stepped down one classification. The cycle is repeated as necessary and the number of cycles is controlled by an adjustable timer included in the circuit. No classifications are skipped following the initial force application and the VL and VH pressures are then available. If the pressure is stepped down to VL or up to VH and pressure VH is not sufficient to bend the rod toward the desired position or pressure VL bends it to the reverse condition, the cycle automatically stops and a signal light indicates a reject part.

The operation of the apparatus will now be explained with particular reference to Figures 10A–D. Switch 300 supplies power to the circuit. At the start of a gaging operation slide 25 is moved inward to carry a rod into position in the gaging and bending station. This actuates switch 308 closing contacts 308A (Figure 10A) and opening contacts 308B (Figure 10B). Spindle case 34 at this point is in a raised position and switch 320 is closed while switch 325 is open. Closing of contacts 308A energizes relay 309 to close contacts 309a, b and open contacts 309c, d. The circuit is thus conditioned for the operation. When slide 25 is pulled out relay 309 is deenergized.

The circuit includes a counter of a commercially available type having a count coil 334CO, a clutch coil 334CL, and controlling contacts 334a–c. The conditions of the counter contacts are shown in the chart of Figure 12. When contacts 308B are opened upon movement of slide 25 into the station, it deenergizes coil 334CL and the counter contacts go from Reset to Count condition with no change in their positions. Count coil 334CO is energized on each gaging operation and, at a predetermined number of operations, the counter contacts go into the End Count condition. Whenever clutch coil 334CL is energized upon retraction of slide 25, the contacts return to Reset condition.

A manually rotatable switch 315 has contact sets 315A and 315B (see Figure 13). When adjusted to Auto position the entire operation is carried out automatically. When in the Manual position the cycle will continue as long as Cycle Start button 312 is kept depressed or until the rod is straightened. When switch 315 is in Set-Up position the gaging spindles will be extended into the rod holes upon depression of Cycle-Start switch 312. The spindles will always be returned upon depression of Emergency Retract switch 310.

During setup with the spindles in the holes and during adjustment of differential heads 340 to 343 it is necessary to depress Gage Reset switch button 328 after each adjustment to destroy the previous gaging circuit switch conditions which are held.

To start the automatic cycle, the switch contacts are initially in the conditions as shown and Cycle-Start button 312 is momentarily depressed, completing a circuit to cycle relay 314, closing contacts 314a, b, c, e and opening 314d to start the cycle. Cycle light 316 is lit. Contacts 314a complete a holding circuit around Cycle-Start switch 312. With the spindles in their retracted positions, switch 320 is closed, relay 321 is energized, and contacts 321a, b are closed. The closing of contacts 314b therefore completes a circuit to solenoid 324 to actuate valve 104, lower case 34, and carry spindles 11 and 12 into the holes of the rod. When the spindles are in their forward position, switch 325 is closed to energize a timer 326 which provides a delay before gaging. Timer 326 immediately closes contacts 326a in order that cycle-start relay 314 and light 316 will remain energized despite a reject, counted out or accept gage indication. The timer has a predetermined time delay to close contacts 326b. When deenergized upon spindle retraction the timer controlled contacts are returned to the conditions shown.

Contacts 326b close to energize timer 327 which controls length of gaging. When timer 327 is energized contacts 327a open immediately in the circuit to spindle forward solenoid 324. Contacts 327b are closed immediately to gaging relays 330 and 331, and light 332 indicates gaging is taking place. After a predetermined delay for gaging, contacts 327d close to solenoid 368 actuating valve 104 to raise case 34 and retract the spindles. At the same time contacts 327c are opened to terminate gaging. In this manner spindles 11 and 12 are advanced and maintained in position for a predetermined gaging period following which they are retracted.

Energization of relays 330 and 331 immediately closes contacts 330a–g and contacts 331a–f and gaging takes place. Count coil 334CO is energized on each gaging operation when switch 331e closes.

The contacts of differential heads 340 to 343 are actuated in response to various rod conditions as previously described with reference to Figure 11. For example, noting head 340, if the center point of the rod 10 is bent upward (or the hole center lines are coned downward) beyond the OK range, contacts 340A will be open and contacts 340B will remain closed. Conversely, if the rod is bent downward the contacts will be in reverse conditions. It is important to note that whenever the parallelism of the crank and pin holes is beyond the allowable tolerance one of switches 340A or 340B will be opened, depending upon the direction of the deviation.

Assuming that the center point is bent upward and contacts 340A are open, relay 345 will be deenergized and relay 346 energized to close contacts 346a, c, d, and open contacts 346b, e, g. Light 335 will be lit indicating the gaged condition. If contacts 340B were open its associated relay 346 would be deenergized while relay 345 would be energized to close contacts 345b, c, e and open contacts 345a, d, f. The circuit portions associated with the other of the differential heads operate correspondingly. Signal lights 335, 347, 348, 352, 353, 358, 359 and 362 indicate the direction of bend of the rod and the magnitude of that condition.

If, upon any gaging during the operation, the rod is within the OK zone, both relays 345 and 346 will be energized and contacts 345c and 346c will be closed to relay 365 (upper relay of Figure 10B). Relay 365 will in turn close contacts 365c and open 365a, b and d. Light 366 will be lit to indicate an accept condition. Switch 365a will open in the circuit to cycle relay 314. Switch 365b, upon opening, terminates gaging, and contacts 365d open in the circuit to reject light 370. Timer 327, energized through contacts 326b, will complete the cycle including retracting spindles 11 and 12 to open switch 325, thus opening contacts 326a and the circuit to cycle relay 314 and light 316.

Assume that on the initial gaging operation the deflection of rod 10 is with its center point upward, requiring a downward application of hammer 14 with a high (H) pressure. In this situation switch contacts 340A, 341A, 342A and 343A would all be open with the other contacts of the differential heads closed. Under these switch conditions, switch contacts 345f, 350c, 354c, and 360c in the circuit to the upper wiper arm of the stepping switch of Figure 10C will be closed. The other switch contacts in this portion of the circuit are opened because their actuating relays are energized.

The stepping switch is of a commercially available type comprising driven wiper arms 416 to 419 mechanically linked together and associated with their respective sets of contacts 1 to 12. The arms are driven in a clockwise direction to increase pressure conditions by energizing coil 407 and in the counterclockwise direction, to decrease pressure conditions, by energizing coil 412. Mechanical linkages and ratchets are included to continue such movement. Stepping switch units of this type also include interrupter contacts which open the circuit to the energized coil to permit successive stepping. Also mechanically opened contacts are employed to prevent stepping of the arms beyond the available contacts.

Contacts 404 cooperate with coil 407 and interrupter contacts 410 cooperate with coil 412. Contacts 406 associated with coil 407 are open when the wipers are to their extreme positions from those shown and contacts 414 to coil 412 are open when the arms are in their "home" or initial starting positions. On the very first wiper movement of an operation coil 407 is energized through wiper 416 and interrupter contacts 404 as the wiper steps from contact to contact and until it reaches a contact which is not energized.

Rectifier 390 supplies direct current for the memory circuit later described, coils 407 and 412 for wiper drive and the associated relays and switches. Resistor 401 and capacitor 402 prevent sparking across contacts 404 and resistor 408 and capacitor 409 similarly prevent sparking across contacts 410.

Master wiper 416 will step in a clockwise or increase pressure direction in response to the initial gaging of an operation until it reaches a dead contact. In the assumed example contacts 1 to 6 associated with wiper 416 will be energized and the wiper will take one step beyond contact 6 to point 7. For that reason the contacts associated with wipers 417 to 419 are designated as to pressure one step beyond those for wiper 416. When wiper 416 steps to position 7 it stops its movement because switch 309d is open.

With wipers 417, 418 and 419 in engagement with their respective number 7 contacts, circuits are completed to relays 421, 424 and 429 respectively. These relays in turn close switches 421a, b; 424a, b; and 429a, b. Closing of any switch in the line to relay 440 energizes the relay and closes contacts 440a to the solenoid portion of the circuit. Solenoid 441, energized through closing of contacts 421b, actuates valve 130 to the gage pressure position. Solenoid 444 actuates valve 127 to the MH and H position while solenoid 449 controls valve 120 to select the H pressure. After a predetermined gaging period as previously mentioned, contacts 327d close and when the spindles are returned a circuit is completed through contacts 321b to relay 375, to the hammer actuating portion of the circuit and to timer 378 (see the central portion of Figure 10B). Relay 375 closes switches 375a, b. Timer 378 times the forward dwell of the applied hammer. It immediately closes contacts 378a and 378c and acts with a time delay to close contacts 378d and open contact 378b. Closing of contacts 378a completes a circuit to booster solenoid 371 which applies the previously controlled and selected pressure to booster unit 134. Switch 432c is opened only in a reject situation.

As previously mentioned, under any deviation of the rod holes beyond the OK range, one pair of contacts 340A or 340B of differential head 340 will be open. In the selected example contacts 340A are open and relay 345 is deenergized. Contacts 345d and 346d are closed and contacts 345e and 346e are open. See the lower portion of Figure 10B. The portion of the circuit associated with these contacts serves to select the particular hammer to be applied and also performs a memory function in case there is a change in direction of the selected pressure between any two consecutive gaging operations. Contacts 346d complete the circuit to relay 394, closing contacts 394a–c and opening contacts 394d. Closing of contacts 394a energizes solenoid 376 to apply the booster pressure hydraulically to cylinder 71 to force hammer 14 downward in opposition to the gaged deflection of rod 10. In each instance the direction of application is determined by relays 394 and 400, energized and held in, and the magnitude is determined by the position of the wiper arms.

After the predetermined dwell of hammer 14 as controlled by timer 378, contacts 378b open in the circuit to the hammer solenoids and contacts 378d close to energize timer 380 which, after a predetermined delay to allow settling of the rod under pressure, opens contacts 380a to the gaging relays, clearing the holding circuits in the gaging portion of the system. As long as the part slide 25 is in its inward position the operation will continue until the rod is brought to a satisfactory condition, is found to be in a condition beyond correction by the apparatus, or until a predetermined number of gaging applications have been made.

When solenoid 368 is energized to retract the spindles, relay 385 is energized and contacts 385a, b, c, e, f, close. Contacts 385d open, taking wiper arm 416 out of the circuit to coil 407. During the remainder of the operation the wipers can move only one step in the selected direction after each gaging.

Relay 385, energized as described when the spindles are first returned, will remain energized through its holding circuit and switch 309b as long as the rod is in position in the station. It accordingly maintains contacts 385c and 385f closed to short circuit the interrupter contacts 404 and 410 preventing a multiple stepping of main wiper 416 in response to subsequent gaging.

A memory circuit is provided to automatically step down the pressure selection one classification if the deflection is reversed following a force application and to automatically step up the pressure selection one classification if the deflection remains in the same direction, as previously mentioned.

With the bend up beyond the OK range as in the example contacts 346d to relay 394 are closed and capacitor 391 is charged. Contacts 346e are open, contacts 345d closed, and 345e open. Until a change in direction of deflection occurs contacts 346d remain closed and relay 394 energized.

If, on the next gaging, the deflection is found to be reversed contacts 346d close, 346e open, 345e close and 345d open—opening the circuit to relay 394 but this relay is then energized through discharge of capacitor 391. Relay 400 is energized closing contacts 400a–c. Resistances 392 and 398 delay capacitor discharge.

During the simultaneous energization of relays 394 and 400 upon any reversal during the operation reverse relay 387 is energized closing contacts 387a, c and opening contacts 387b. Decrease pressure coil 412 is thus energized to move wipers 416—419 and step the pressure down on selection. Contacts 394d and 400d are both open to increase pressure winding 407. The direction of application is determined as previously described. Solenoid energization, valve actuation and the like also proceed as before. Thus a reduced pressure is obtained in response to a reversal of deflection and is applied in opposition to the deflection.

If the deflection is in the same direction on any two consecutive gagings the same one of relays 394 or 400 will be energized, reverse relay 387 will not be energized, and one of contacts 394d or 400d will be closed to increase pressure coil 407 to move the wipers one step clockwise.

If at any time VL pressure is applied (note contact 3 associated with wiper 419) and proves excessive (reversing the direction of bend), the switch arm will step down to contact 2 leading to reject relay 432 to stop the operation and signaling the condition. Similarly, if at any time VH pressure (contact 8) proves insufficient (the bend remaining in the same direction), the wiper will step up to contact 9, energizing reject relay 432 closing contact 432b to reject light 370 and opening contacts 432a, c, d to terminate the cycle and signal a reject rod.

When counter 334 has counted a predetermined number of gaging and bending cycles it goes into the End Count condition with its contacts as shown in Figure 12, the reject light 370 is lit and the operation is ended with the spindles retracted.

When slide 25 is retracted to move the rod from the station relay 309 is deenergized, opening contacts 309a, b and closing 309c, d. Relay 385 is deenergized, allowing a multiple stepping of the wipers. Contacts 309c, d complete a circuit to coil 412 to step the wipers to their original positions (vertical as illustrated) at which point contacts 414 open.

Thus it is seen that an apparatus has been provided for bending a part to a desired configuration in a rapid and efficient manner. The force applications are automatically determined and interrelated to properly bend the parts irrespective of their variations in flexibility. Through the use of the apparatus holes such as pin or crank holes in connecting rods can be brought to a predetermined desired relationship.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for bending a part to a predetermined configuration comprising a base, means on said base for supporting a part, controllable means on said base for automatic sequential application of forces to said part of selected magnitude and direction, means on said base for gaging the part configuration, and control means operatively interconnecting said force applying means and said gaging means for automatically determining and applying a second force application to the part in response to the amount the part is bent by a first applied force and the deviation of the part from the desired configuration, said control means including means providing force application against part deviation, of decreased magnitude if the preceding application bends the part beyond a desired amount and of increased magnitude if less than the desired bend is obtained.

2. Apparatus for bending a part to a predetermined configuration, comprising a base, means on said base for supporting a part, controllable means on said base for application of force to said part of selected magnitude and different directions, means for gaging the direction and magnitude of part deviation from the desired configuration, control means for said force applying means for an initial force application to the part of a controlled amount, memory means for the direction and magnitude of the initial force application, said control means including means responsive to both said gaging means and said memory means for automatically determining a subsequent force application to said part of selected direction against the part deviation and based on the characteristics of the particular part under process.

3. Apparatus for bending a part to a predetermined configuration comprising a base, means on said base for supporting a part, controllable means on said base for selective application of force to said part from different directions, means for gaging the direction and magnitude of part deviation from the desired configuration, control means for said force applying means for an initial force application of controlled amount, said control means having means responsive to the amount the part is bent by the applied force and the direction and magnitude of the force application for determining the direction and magnitude of a second applied force based on the characteristics of the particular part being formed, including means for obtaining a second force application in opposition to the part deviation of increased magnitude if the direction of deviation remains the same following the first force application, and means for obtaining a second force application in opposition to part deviation and reduced in magnitude if the direction of deviation is reversed by the first force application.

4. Apparatus for bending a part to a predetermined configuration comprising a base, means on said base for supporting a part, controllable means on said base for selective application of force to said part, means for gaging the direction and magnitude of part deviation from the desired configuration, means responsive to said gaging means for controlling said force applying means for a first force application in opposition to the part deviation of a magnitude determined by the amount of deviation, said controlling means including memory means for obtaining a second force application in opposition to the part deviation of increased magnitude if the direction of deviation remains the same following the first force application, and means for obtaining a second force application in opposition to part deviation and reduced in magnitude if the direction of deviation is reversed by the first force application.

5. Apparatus for bending a part to obtain a predetermined desired relation between a pair of holes therein comprising a base, a gaging and bending station on said base including means for supporting a part, controllable means at said station for application of bending force to said part including means providing a plurality of selectively applicable forces in step relationship, gaging means at said station for cooperation with the holes of the part to determine the relationship between the axes thereof, means operatively interconnecting said force applying means and said gaging means, means for automatically applying a first force application to said part, and means for automatically determining a second force application to the part in response to the amount the holes are bent toward the desired relationship by the first applied force and the deviation of the holes from the desired relationship including means increasing the force application one step if the direction of deviation remains the same and decreasing the force application one step if the direction of deviation is reversed.

6. Apparatus for bending a part such as a connecting rod or the like to obtain a predetermined angular relationship between the axes of a pair of holes therein comprising a base, a gaging and bending station on said base, said station including controllable force means for selective application of bending forces to the part to vary the angular relationship between the holes, means at said station for gaging the angular relationship between the axes of the holes, control means cooperating between said force applying means and said gaging means to automatically apply the bending force to the part, and means responsive to said gaging means and the relationship between the axes of the holes for automatically determining the direction and magnitude of force application to bend the part to place the holes in the desired relationship.

7. Apparatus for bending a part to obtain a predetermined desired relation between a pair of holes therein comprising a base, a gaging and bending station on said base including means for supporting a part, controllable force applying means at said station for sequentially applying bending forces to said part, means at said station including probe means for cooperation with the holes to gage the relationship between the holes and their deviation from the predetermined desired relation following the force application, and control means responsive to said gaging means and to the direction and magnitude of a first force application in said sequence for automatically increasing or decreasing the magnitude and selecting the direction of a subsequent force application to the part, said control means including means for obtaining a second force application in opposition to the part deviation of increased magnitude if the direction of deviation remains the same following the first force application, and means for obtaining a second force application in opposition to part deviation and reduced in magnitude if the direction of deviation is reversed by the first force application.

8. Apparatus for bending a part to obtain a predetermined relationship between the axes of a pair of holes therein comprising a base, a gaging and bending station on said base for receiving a part, controllable force applying means at said station for application of bending forces to said part, means at said station for gaging the axial relationship between the holes including probe means for insertion into the holes and retraction therefrom, means responsive to said gaging means for automatically controlling said force applying means for bending said part to obtain the desired relation between the gaged holes, and means operatively interconnecting said gaging means and said force applying means for automatic insertion and retraction of the gaging probes and application of the force applying means in a predetermined relationship.

9. Apparatus for bending a part such as a connecting rod or the like to obtain a predetermined relationship between the axes of a pair of holes therein comprising a base a gaging and bending station on said base for receiving a part, controllable force applying means at said station for selective application of opposed bending forces to the part, a pair of gaging probes at said station carried for movement into the holes and retraction therefrom, said probes carrying means for gaging the axial relationship between the holes, control means responsive to said gaging means and the axial relationship between the holes for automatically controlling said force applying means as to direction and magnitude of force application to the part, and means interconnecting said probes and said force applying means for insertion of the probes into the part holes for gaging and retraction of the probes before force application in a predetermined automatic sequence.

10. An apparatus as set forth in claim 9 wherein said force applying means includes aligned plungers disposed for selective engagement with the part between the holes, said gaging means including a carrier supporting said probes to each side of one of said plungers for movement therealong to and from gaging position.

11. An apparatus as set forth in claim 9 wherein said probes include air leakage gaging means for situation in opposition to the hole walls to obtain gaging pressures responsive to the relationship therebetween, said controllable force applying means including fluid pressure operated means for application of force to the part, and valve means controlled by the gaging pressures for determining the fluid pressure and the force application.

12. An apparatus as set forth in claim 9 further comprising means for moving parts into and out of position in said station through a movement transverse the axes of said probes.

13. An apparatus as set forth in claim 9 wherein said control means includes means for determining a force application to the part in response to the amount the holes are bent under an applied force and the deviation of the holes from the desired relationship.

14. An apparatus as set forth in claim 9 wherein said control means comprises means for applying a first force to the part, and means for obtaining a second force application in opposition to the part deviation of increased magnitude if the direction of deviation remains the same following the first force application and reduced in magnitude if the direction of deviation is reversed.

15. An apparatus for bending a connecting rod to obtain the desired parallelism between the crank and pin holes, comprising a base, a gaging and bending station on said base, means for carrying a rod into and out of said station, force applying means at said station for selective application to opposite sides of said rod between the ends thereof in opposite directions generally parallel to the crank and pin holes retractable gaging spindles for insertion into the holes, said spindles including gaging means for determining the deviation of the pin and crank holes from the desired parallelism, control means for said apparatus including means operatively interconnecting said force applying means and said gaging means for automatic retraction of the gaging spindles before force application, and memory means connected for response to said gaging means and in control relation to said force applying means for determining the direction and magnitude of force application after the gaging spindles are retracted.

16. An apparatus as set forth in claim 15 wherein said carrying means is movable to carry a connecting rod into and out of the station through a movement transverse the spindle axes, said station including supporting pads in opposition to the ends of the rod and cooperating with the force applying means for bending the rod in selected directions.

17. An apparatus as set forth in claim 15 wherein said gaging means include air leakage orifice means in a common gaging plane for situation in opposition to the hole walls, said memory means including electrical means responsive to the flow through said orifices, and valve means controlled thereby for controllable operation of said force applying means.

18. An apparatus for bending a connecting rod to obtain the desired parallelism between the crank and pin holes therein, comprising a base, a gaging and bending station on said base, slide means for carrying a rod into and out of said station, opposed fluid pressure force applying means at said station for selective application to opposite sides of said rod at substantially the mid-point thereof, rectractable gaging spindles for simultaneous insertion into the holes, said spindles including gaging means for determining the deviation of the pin and crank holes from the desired parallelism, control means for said apparatus including means operatively interconnecting said force applying means and said spindles for automatic retraction of the gaging spindles during force application, memory means for determining the direction and magnitude of force application after the gaging spindles are retracted for an initial force application in opposition to the deviation and of a magnitude determined by the amount of deviation, means for automatically obtaining a second force application in opposition to the gaged deviation of an increased magnitude if the direction of deviation remains the same following the first force application, and means for obtaining a second force application in opposition to the gaged deviation and reduced in magnitude if the direction of deviation is reversed.

19. An apparatus for bending a connecting rod to obtain the desired parallelism between the crank and pin holes therein, comprising a base, a gaging and bending station on said base, means for carrying a rod into and out of said station, opposed fluid pressure force applying means at said station for selective application to opposite sides of said rod between the ends thereof, retractable gaging spindles for insertion into the holes, said spindles including gaging means for determining the deviation of the pin and crank holes from the desired parallelism, control means for said apparatus including means operatively interconnecting said force applying means and said spindles for automatic retraction of the gaging spindles before force application, memory means for determining the direction and magnitude of force application after the gaging spindles are retracted for an initial force application in opposition to the deviation and of a magnitude determined by the amount of deviation, means for automatically obtaining a second force application in opposition to the gaged deviation of an increased magnitude if the direction of deviation remains the same following the first force application, and means for obtaining a second force application in opposition to the gaged deviation and reduced in magnitude if the direction of deviation is reversed.

References Cited in the file of this patent

UNITED STATES PATENTS

| | | |
|---|---|---|
| 358,116 | Gustin | Feb. 22, 1887 |
| 358,810 | Gustin | Mar. 1, 1887 |
| 1,239,533 | Sponsel | Sept. 11, 1917 |
| 1,840,237 | Leighton | Jan. 5, 1932 |
| 2,364,989 | Mallina | Dec. 12, 1944 |
| 2,389,206 | McKinney | Nov. 20, 1945 |
| 2,426,390 | DeForest | Aug. 26, 1947 |
| 2,431,014 | Aller | Nov. 18, 1947 |
| 2,472,163 | Lantz | June 7, 1949 |
| 2,557,947 | Deakin | June 26, 1951 |
| 2,642,115 | Van Huffel | June 16, 1953 |